United States Patent
Dasen, Jr.

(10) Patent No.: US 10,092,140 B2
(45) Date of Patent: Oct. 9, 2018

(54) FANNING PLATE FOR A BAKED POTATO

(71) Applicant: Richard Arnold Dasen, Jr., Kalispell, MT (US)

(72) Inventor: Richard Arnold Dasen, Jr., Kalispell, MT (US)

( * ) Notice: Subject to any disclaimer, the term of this patent is extended or adjusted under 35 U.S.C. 154(b) by 0 days.

(21) Appl. No.: 14/924,412

(22) Filed: Oct. 27, 2015

(65) Prior Publication Data

US 2016/0120371 A1    May 5, 2016

Related U.S. Application Data

(60) Provisional application No. 62/073,715, filed on Oct. 31, 2014.

(51) Int. Cl.
   *A47J 43/18*    (2006.01)

(52) U.S. Cl.
   CPC .................... *A47J 43/18* (2013.01)

(58) Field of Classification Search
   CPC .................................................... A47J 43/18
   USPC ........ 220/573.1; 426/637, 523, 512; 99/425, 99/249, 426, 445
   See application file for complete search history.

(56) References Cited

U.S. PATENT DOCUMENTS

| | | |
|---|---|---|
| 644,401 A | 2/1900 | Browne |
| 1,718,668 A | 3/1928 | Smythe |
| 2,939,383 A | 6/1960 | Kanaga |
| 3,635,732 A * | 1/1972 | Bissett .................. A22C 17/006 426/421 |
| 3,713,379 A * | 1/1973 | Gordy ................. A47J 37/0688 99/349 |
| 3,987,719 A | 10/1976 | Kian |
| 4,387,111 A * | 6/1983 | Mullender ............... A23G 3/50 426/512 |
| 4,704,510 A | 11/1987 | Matsui |
| 5,201,264 A | 4/1993 | Thelen et al. |
| 5,323,692 A | 6/1994 | Grzywna et al. |
| 6,054,697 A | 4/2000 | Woodward et al. |
| 6,170,160 B1 | 1/2001 | Freige |
| 6,175,105 B1 | 1/2001 | Rubbright et al. |
| D462,585 S | 9/2002 | Parra |
| 6,672,473 B2 | 1/2004 | Torniainen |
| 8,245,633 B2 * | 8/2012 | Klinger .................... A21B 3/13 220/573.1 |
| D721,219 S * | 1/2015 | Rogers ........................... D1/199 |
| 2009/0120303 A1 * | 5/2009 | Popeil ................. A47J 37/1209 99/403 |
| 2009/0260525 A1 | 10/2009 | Jordan et al. |
| 2010/0065571 A1 | 3/2010 | Olson |
| 2016/0207212 A1 * | 7/2016 | Rogers ................. B26D 1/0006 |

OTHER PUBLICATIONS

Author: Jean Anderson, Title:: Baked Hasselback Potatoes, Date: Jan. 2005, www.myrecipes.com (1 page).*

(Continued)

*Primary Examiner* — Stephen Castellano
(74) *Attorney, Agent, or Firm* — Sarah J. Rhoades

(57) ABSTRACT

A fanning plate for a baked potato provides an arched top surface to fan out the slices of a Hasselback potato during the seasoning and baking process, allowing the potato slices to crisp properly, as well as raised rims and endcaps to keep the seasonings contained and prevent a mess. Multiple plates may be easily stacked for compact storage.

13 Claims, 3 Drawing Sheets

(56) References Cited

OTHER PUBLICATIONS

Baked Hasselback Potatoes, myrecipes (myrecipes.com), Jean Anderson, Jan. 2005, Doubleday Cookbook, p. 1.*
Spiced Mini Hasselback Potatoes, Seasaltwith food (seasaltwithfood.com), Oct. 27, 2009, pp. 1-3.*
Sweet Potato Hasselback with Buttermilk Cheese Dressing, ( vegetarianirvana.wordpress.com), Mar. 21, 2011, pp. 2-4.*

* cited by examiner

FANNING PLATE FOR A BAKED POTATO

CROSS-REFERENCE TO RELATED APPLICATIONS

This Application claims the benefit of U.S. Provisional Application No. 62/073,715, filed Oct. 31, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to kitchen utensils and in particular to a fanning plate for a baked potato. Baking a Hasselback potato involves slicing the potato laterally in thin slices such that it is cut almost through, with the skin and a bit of potato holding the slices together. Seasonings and oil are then sprinkled between the slices and the potato is baked. Unfortunately, it is difficult to hold the potato together while fanning out the slices during the seasoning and baking process. A fanning plate, with an arched top surface to fan out the slices of the Hasselback potato, would resolve this problem.

SUMMARY OF THE INVENTION

Accordingly, the invention is directed to a fanning plate for a baked potato. The plate provides an arched top surface to fan out the slices of a Hasselback potato during the seasoning and baking process, allowing the potato slices to crisp properly, as well as raised rims and endcaps to keep the seasonings contained and prevent a mess. Multiple plates may be easily stacked for compact storage.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

Figure 1:
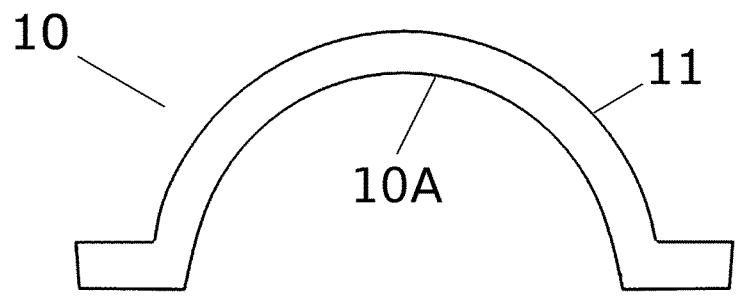
FIG. 1 is a front view of the first exemplary embodiment, displaying the plate 10, the arch 10A, and the rim 12.
Figure 2:
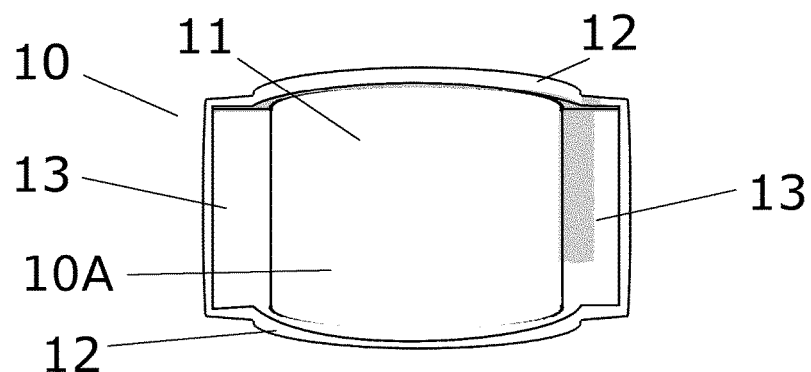
FIG. 2 is a top view of the first exemplary embodiment, displaying the plate 10, the arch 10A, the top surface 11, the rims 12, and the endcaps 13.
Figure 3:
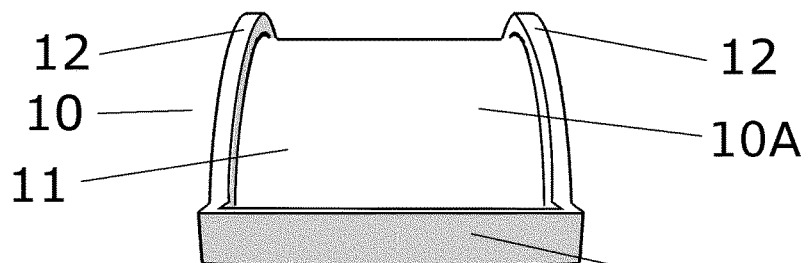
FIG. 3 is a side view of the first exemplary embodiment, displaying the plate 10, the arch 10A, the top surface 11, the rims 12, and an endcap 13.
Figure 4:
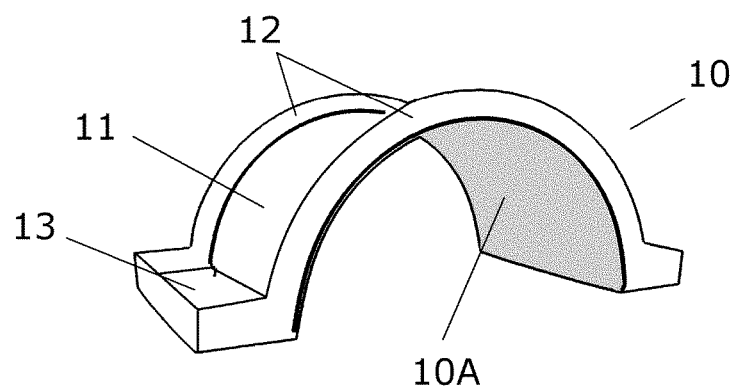
FIG. 4 is a front perspective view of the first exemplary embodiment, displaying the plate 10, the arch 10A, the top surface 11, the rims 12, and an endcap 13.
Figure 5:
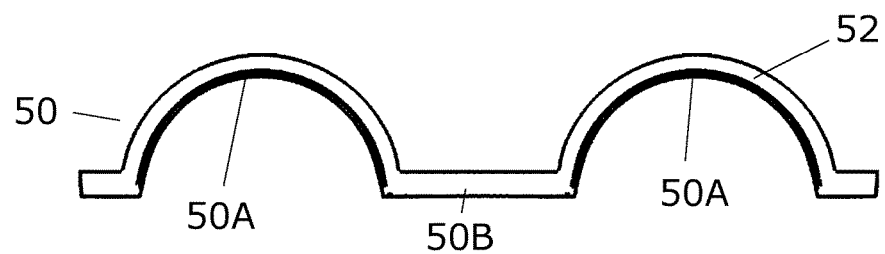
FIG. 5 is a front view of the second exemplary embodiment, displaying the plate 50, the pair of arches 50A, the central flat region 50B, and the rim 52.
Figure 6:
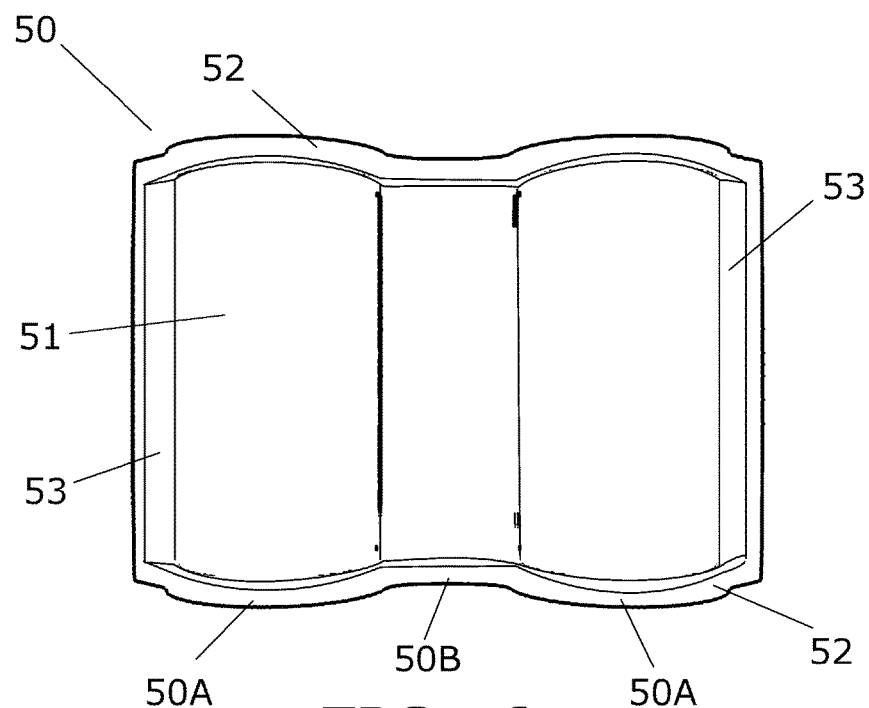
FIG. 6 is a top view of the second exemplary embodiment, displaying the plate 50, the pair of arches 10A, the central flat region 10B, the top surface 51, the rim 52, and the endcaps 53.
Figure 7:
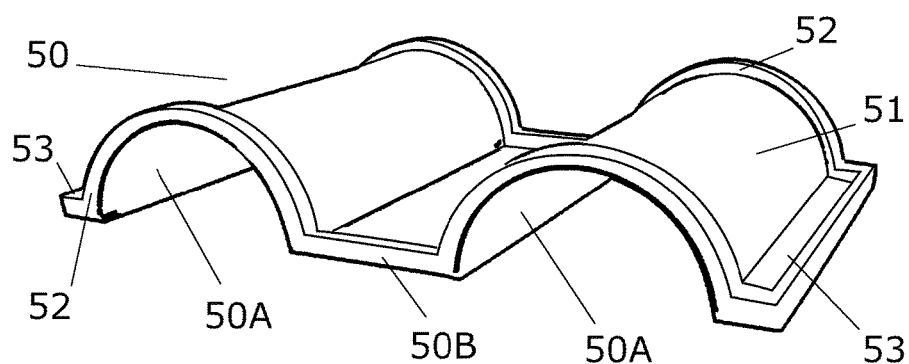
FIG. 7 is a front perspective view of the second exemplary embodiment, displaying the plate 50, the pair of arches 10A, the central flat region 10B, the top surface 51, the rim 52, and the endcaps 53.

Referring now to the invention in more detail, the invention is a fanning plate 10 for a baked potato.

The first exemplary embodiment is comprised of a fanning plate 10 which provides a top surface 11 over an arch 10A to fan out the slices of a Hasselback potato during the seasoning and baking process, allowing the potato slices to crisp properly, as well as raised rims 12 and endcaps to 13 keep the seasonings contained and prevent a mess. Multiple plates 10 may be easily stacked for compact storage.

To use the first exemplary embodiment, the user may place the plate 10 on a counter or other preparation surface, place a large potato on surface, and cut the potato into thin slices, not quite cutting all the way through. The user may then fan out the slices of the potato over the top surface 11 and sprinkle the seasonings between the slices. One or more plates 10, bearing potatoes with seasonings, may then be placed on a cookie sheet or in a baking pan and put into the oven for baking.

In a second exemplary embodiment, a larger plate 50 may have about the footprint of a cookie sheet. The larger plate 50 is preferably structured with a pair of arches 10A, or more separated by a central flat region 50B, with endcaps 53 at either end. The larger plate 50 has a top surface 50 extending over both of the arches 50A, the central flat region 50B, and the end caps 53. A rim 52 surrounds the perimeter of the larger plate 50. The larger plate 50 is preferably of a size sufficient to accommodate multiple baked potatoes side by side on the same arch 50A, for example having a capacity of four or six backed potatoes, two or three on each arch 50A.

The plate 10 or 50 is preferably manufactured from a rigid, durable material which is heat resistant and dishwasher safe, such as stainless steel, aluminum alloy, or tempered glass. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A slice-fanning plate and a Hasselback-sliced food item, wherein the slice-fanning plate comprises:
    an arched top surface fanning out slices of the Hasselback-sliced food item,
    a raised rim surrounding the arched top surface, and
    a pair of end caps located at either end of the arched top surface.

2. The slice-fanning plate and Hasselback-sliced food item of claim 1, wherein the at least one arched top surface is comprised of a singular arched top surface.

3. The slice-fanning plate and Hasselback-sliced food item of claim 2, wherein the raised rim frames the singular arched top surface.

4. The slice-fanning plate and Hasselback-sliced food item of claim 2, wherein the singular arched top surface terminates at the pair of end caps.

5. The slice-fanning plate and Hasselback-sliced food item of claim 1, wherein the pair of end caps cooperate with the raised rim to create two separate reservoirs.

6. The slice-fanning plate and Hasselback-sliced food item of claim 1, wherein the raised rim and the pair of end caps contain messes during the seasoning and baking process.

7. The slice-fanning plate and Hasselback-sliced food item of claim 2, wherein the singular arched top surface, the raised rim, and the pair of end caps are formed to permit stackable storage of multiple slice-fanning plates.

8. The slice-fanning plate of claim 1, further comprising raised rims framing each arched top surface, a central flat region between each arched top surface, and a set of enclosing endcaps.

9. A method for preparing a Hasselback-sliced food item comprises the steps of:
    A. providing a slice-fanning plate of claim 1,
    B. creating the Hasselback-sliced food item of claim 1 by slicing partially through but not completely through a food suited to lateral slicing into thin slices,
    C. fanning out the thin slices of the Hasselback-sliced food item over the arched top surface,
    D. sprinkling the Hasselback-sliced food item with seasonings and oil between the thin slices,
    E. placing the slice-fanning plate on a baking surface, and
    F. cooking the Hasselback-sliced food item fanned across the arched top surface of the fanning plate.

10. The method for preparing the Hasselback-sliced food item of claim 9, wherein steps A-E are repeated to prepare more than one Hasselback-sliced food item cooked simultaneously in step F.

11. The method for preparing the Hasselback-sliced food item of claim 10, wherein one or more fanning plates are used to simultaneously cook the more than one Hasselback-sliced food item.

12. The method for preparing the Hasselback-sliced food item of claim 10, wherein step B is performed after placing a food suited to lateral slicing on a cutting surface.

13. The slice-fanning plate and Hasselback-sliced food item of claim 1, wherein the slice-fanning plate has a generally rectangular profile in plan view and the raised rim surrounds the arched top surface along four sides.

* * * * *